United States Patent
Kaneko et al.

(10) Patent No.: US 6,886,087 B2
(45) Date of Patent: Apr. 26, 2005

(54) SEMICONDUCTOR MEMORY DEVICE

(75) Inventors: Tetsuya Kaneko, Chiba (JP); Hiroaki Wake, Chiba (JP); Youichi Endo, Chiba (JP)

(73) Assignee: Seiko Instruments Inc., Chiba (JP)

( * ) Notice: Subject to any disclaimer, the term of this patent is extended or adjusted under 35 U.S.C. 154(b) by 294 days.

(21) Appl. No.: 10/153,509

(22) Filed: May 22, 2002

(65) Prior Publication Data

US 2002/0184458 A1 Dec. 5, 2002

(30) Foreign Application Priority Data

May 31, 2001 (JP) ........................................ 2001-165315
Mar. 29, 2002 (JP) ........................................ 2002-096827

(51) Int. Cl.[7] ............................................. G06F 12/00
(52) U.S. Cl. ...................... 711/164; 711/154; 711/103; 713/202; 705/44
(58) Field of Search ................................. 711/164, 154, 711/103; 713/202; 705/44

(56) References Cited

U.S. PATENT DOCUMENTS

| | | | | |
|---|---|---|---|---|
| 5,048,085 A | * | 9/1991 | Abraham et al. | 713/159 |
| 5,184,481 A | * | 2/1993 | Joseph et al. | 63/12 |
| 5,818,771 A | * | 10/1998 | Yasu et al. | 365/195 |
| 5,912,849 A | * | 6/1999 | Yasu et al. | 365/195 |
| 6,681,304 B1 | * | 1/2004 | Vogt et al. | 711/164 |

* cited by examiner

Primary Examiner—Stephen Elmore
(74) Attorney, Agent, or Firm—Adams & Wilks

(57) ABSTRACT

A semiconductor memory device reliably protects data written once into a non-volatile memory and exhibits high EEPROM data security functionality. The device has a user memory area to which a user can write freely chosen data, and a write-information storage memory area for storing information indicating whether or not data has been written into the user memory area. A control logic circuit analyzes whether to execute a write command from a user and outputs a write-prohibition signal if data is already written into the user memory area. The control logic circuit may include a password authentication circuit for authenticating a user-inputted password by comparing it with a password maintained inside the control logic circuit. The frequency of a changeable clock may be used to perform password authentication.

16 Claims, 3 Drawing Sheets

SEMICONDUCTOR MEMORY DEVICE

BACKGROUND OF THE INVENTION

1. Field of the Invention

The present invention relates to an electrically rewritable semiconductor memory device.

2. Description of the Related Art

In an electrically writable/erasable non-volatile memory, a user inputs a given instruction for writing/erasing data into an input interface of an IC, thereby being capable of writing desired data into a non-volatile memory of an EEPROM (electrically erasable and programmable read-only memory).

The given instruction is an input signal pattern for inputting an electric signal via a terminal that is provided for the EEPROM for communication with the exterior, to thereby operate the EEPROM. The input signal pattern, being determined in advance for each EEPROM, is inputted and the EEPROM executes the operation instructed by the user, such as writing/erasing the data.

The writing/erasing can be performed any desired number of times. Therefore, it is not uncommon that the user mistakenly writes other data over the data which was written into the non-volatile memory, or mistakenly erases it.

Conventionally, in order not to mistaken y overwrite or erase the data that is written once, an EEPROM protection function for preventing erroneous writing and erroneous erasing is commonly used. The protection function is a function such that writing and erasing are not performed on the EEPROM even when the given instruction for performing the writing/erasing of the data into the EEPROM is inputted. A given instruction to make the protection function operate is synchronized to a given clock and inputted to make the EEPROM function.

The given clock is a clock which is inputted from the exterior, or a clock generated at an internal location. The clock frequency is a fixed frequency.

Further, in the conventional art, since the clock frequency is a fixed clock frequency, there is a high possibility that the fixed clock frequency will coincide with the frequency set for the given instruction that makes the protection function operate.

Conventionally, in a case where the writing of data to the non-volatile memory is performed only once, and writing is prohibited after the second time even when the user performs a write action, the EEPROM protection function such as described above is commonly used.

In the protection, the given instruct ion for making the protection function operate is inputted into the input interface of the IC, so that, thereafter, the IC does not execute the writing/erasing even when the user gives a writing/erasing command, thus protecting the memory data as it was be fore the protection operation. Alternatively, in order to activate the protection function, a given signal is applied to a terminal arranged to the EEPROM, causing the protection function to operate.

However, in order to make the protection function operate, the user must either input the given instruction or input the given signal to a certain terminal, as described above. Thus, there was a problem in that after the data is written to the EEPROM, in order to protect the data, a burden is imposed on the user so that the user must input the signal to the EEPROM.

Further, since the given instruction and input signal must be inputted correctly to make sure the protection function operates, there was a problem in that such a requirement may interfere with the user's objective that the data written into the memory be protected in a reliable fashion.

Conventionally, since the clock frequency is a fixed clock frequency, there is the high possibility that the frequency set for the given instruction to make the protection function operate. which is synchronized with the clock frequency, will coincide with the fixed clock frequency. This problem can be overcome by increasing the number of bits of the given instruction. However, increasing the number of bits of the given instruction increases the scale of the circuit.

SUMMARY OF THE INVENTION

In order to solve the above-mentioned problems, in the present invention, the data written once into the non-volatile memory is protected in a reliable manner without burdening the user with providing a signal to the EEPROM. The following measures are provided to achieve this object.

In accordance with the present invention, in addition to a user memory area being a memory to which a user can write freely chosen data, a write-information storage memory is separately provided, which is a memory for storing information indicating whether or not data has been written to the user memory area.

The user memory area is a memory array to which given data can be written by inputting a given write/erase commend via an input interface arranged to an IC. The write-information storage memory area is a memory for storing information indicating whether or not the user has written data to the user memory. The write-information storage memory is composed of a 1-bit memory, and, for example, "0" indicates that no data has been written to the user memory, and "1" indicates that data has already been written thereto.

Further, by arranging a 1-bit write-information storage memory, which is associated with the user memory array in a given area, it becomes possible to provide information indicating whether or not data has been written, with respect to each user memory array area.

In accordance with the present invention, when the user inputs the write command to the IC, the IC automatically reads out the data in the write-information storage memory that is associated with the user memory to which data is to be written. Based on this data, a judgment is then made as to whether or not it is possible to write data to the user memory. If no data has been written to the user memory, then the IC can perform the writing, and if data has already been written thereon, then the writing is cancelled so that data, which has already been written in, can be protected. According to the example described above, if the data in the write-information storage memory which was read out indicates "0", then the IC can perform the writing, and if the data indicates "1", then it can cancel the writing.

In the reading of the data from the write-information storage memory, when the user inputs the write command to the IC, the IC automatically performs the reading, and then it makes the judgment as to whether or not to write the data. Therefore, other than inputting the write command, the user bears no burden such as sending a signal. Further, the IC performs the judgment as to whether writing is possible or not. Therefore, it is possible to avoid overwriting of data caused by the user's erroneous inputs in the protection function, for example, thus enabling enhanced reliability with which the data is held.

In accordance with the present invention, when the user writes data to a given address, the IC automatically writes the data to the write-information storage memory corresponding to the user area at the address.

When the user inputs the write command to the IC, data can be written to a given user memory area a first time, and then after that the writing is cancelled and the data in the user area to which data was already written to is maintained. Therefore, in a case where the writing was performed to a memory array to which no data has been written, data which indicates that writing has already been performed to the memory array is automatically written into the write-information storage memory that corresponds to that memory array, thereby causing the writing to be cancelled on the second and subsequent times. The writing of data to the write-information storage memory is performed automatically by the IC when data is written to the user area. Thus, there is no burden for the user to send a signal, other than inputting the write command.

In accordance with the present invention, the write-information storage memory may be composed of a non-volatile memory. Therefore, the information indicating whether or not the writing has been performed can be protected regardless of electric voltage being turned on or off, thus enabling enhanced reliability of the data retention.

In accordance with the present invention, since the write-information storage memory may be composed of a volatile memory, when the power source is turned off, the stored information is initialized and the write-information storage memory is cleared, thereby being capable of eliminating the trouble of performing initialization, and of enabling improved convenience of use.

In accordance with the present invention, the circuitry construction of the write-information storage memory is such that writing to the write-information storage memory cannot be performed no matter how the user rewrites the address by sending the write/erase command. Therefore, it is possible to prevent the protection function from being canceled or released by an erroneous command by the user. In order to write data to the memory for the purpose of, that is, initializing the information in the memory, when a given command is inputted via an input interface, the data can be written to the memory.

In accordance with the present invention, the write-information storage memory can also be used as the user memory, thereby being capable of enabling the memory to have both functions as the user memory to which the user can write freely chosen data and as the protection function. As a result, the convenience of use is improved.

In accordance with the present invention, the write-information storage memory is constructed within the same byte as the user memory. Typically, the EEPROM is constructed such that a memory cell with a plurality of bits serves as one byte, and data are written to a plurality of memory cells at one time. In a serial EEPROM, one byte is often constructed with eight memory cells. According to the present invention, by arranging the one bit of the write-information storage memory within the same byte as the plurality of bits of the user memory, it becomes possible to write data to the write-information storage memory simultaneously when writing data to the user memory. Thus, there is no extra write time for writing data to the write-information storage memory. The write time is often defined as a specification of the EEPROM, and it is possible to eliminate the demerit of causing extra write time.

In accordance with the present invention, a password authentication circuit for making the protection function operate is provided in place of a predetermined instruction for making the protection function operate. Therefore, it becomes possible to increase the number of settings for the protection state.

In accordance with the present invention, the frequency of the clock used in the password authentication is changeable, and password authentication is performed by means of the changeable clock. This arrangement is equivalent to increasing the possible number of password settings with respect to a given password, by the possible number of clock frequency settings as described above, thereby practically increasing the possible number of password settings.

In accordance with the present invention, since the clock setting data may be constructed as non-volatile, it is possible to protect the clock setting data regardless of the electric voltage being turned on or off, and the trouble of setting the clock setting data again is eliminated, thus enabling improved convenience of use.

In accordance with the present invention, since the clock setting data may be constructed as volatile, when the power source is turned of f the clock setting data is initialized and the clock setting data is cleared, and the trouble of initializing the data is eliminated, thus enabling improved convenience of use.

In accordance with the present invention, since the clock setting data can be controlled from an external terminal exclusively used for this purpose, it becomes possible to change the clock setting data whenever needed, thus enabling improved convenience of use.

In accordance with the present invention, since the password data for authentication my be constructed as non-volatile, the password data for the authentication can be protected regardless of the electric voltage being turned on or off, and the trouble of setting again the password data for the authentication is eliminated, thus enabling improved convenience of use.

In accordance with the present invention, since the password data for authentication may be constructed as volatile, when the power source is tuned off the password data for the authentication is initialized and the clock setting data is cleared, thus eliminating the trouble of initializing the data, and thus enabling improved convenience of use.

In accordance with the present invention, since the password data for the authentication is set using the external terminal, it becomes possible to change the password data for the authentication whenever needed, thus enabling improvement of the convenience of use.

DETAILED DESCRIPTION OF THE PREFERRED EMBODIMENTS

Hereinafter, embodiments according to the present invention will be described in detail, with reference to the drawings.

(Embodiment 1)

Figure 1:
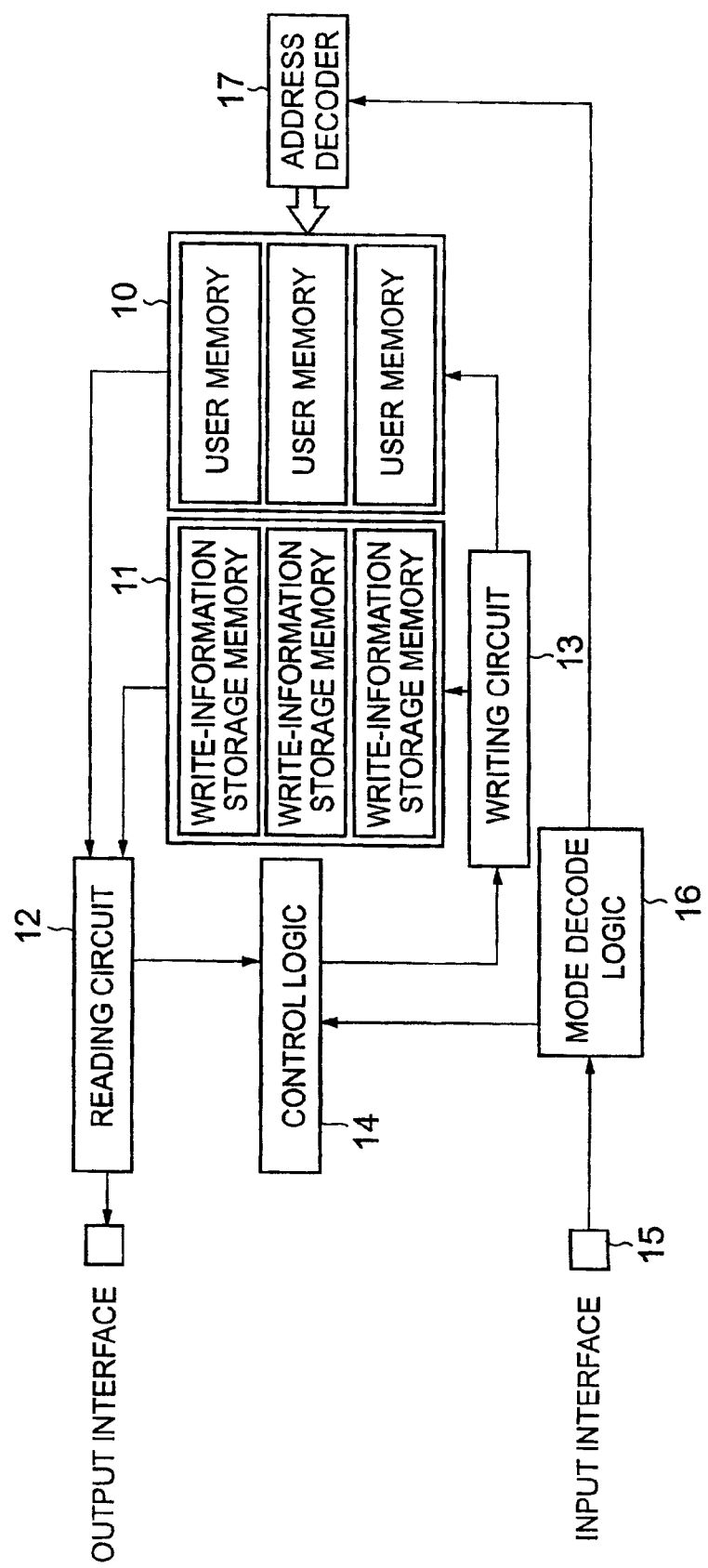
FIG. 1 is a diagram showing a circuit structure of memory circuitry according to Embodiment 1 of the present invention.

Detailed explanation will now be made of a memory circuit in accordance with Embodiment 1 of the present invention. FIG. 1 is a block diagram showing a construction of the memory circuit according to Embodiment 1 of the present invention. The memory circuit is composed of a user memory area 10 into which a user can write freely chosen data; a write-information storage memory area 11 for storing the data written into the user memory; a reading circuit 12 for reading the data that is in the user memory and in the write-information storage memory; a writing circuit 13 for writing data to the user memory and to the write-information storage memory; and a control logic circuit 14 for analyzing whether to execute a write command from the user, based on the data read out from the write-information storage memory. The user memory area 10 is a memory array to which freely chosen data can be written by inputting a given write/erase command via an input interface 15 arranged to the IC.

The write-information storage memory area 11 is memory storing information indicating whether or not the user has written data into the user memory which consists of given units. The write-information storage memory is composed of 1-bit memory units, in which, for example, "0" indicates that no data has been written to the memory, and "1" indicates that data has already been written to the memory. In the following explanation of the write-information storage memory, "0" indicates that no data has been written to the memory and "1" indicates that data has already been written to the memory.

When freely chosen data is to be written to the EEPROM, the user inputs a given signal corresponding to the write command, an address to which data is to be written and the write-information, via the input interface of the IC.

Typically, when a mode decode logic 16 of the EEPROM receives the write command, an address decoder 17 selects the above-mentioned address, and the above-mentioned data is written to the address via the write circuit 13.

In the present invention, when the write command is received, the data corresponding to the address is read out from the write-information storage memory, and the control logic circuit determines whether or not data has already been written to the address.

Here, when the data in the write-information storage memory is "1" indicating that data has been written to the user memory, the control logic circuit 14 receives the signal outputted from the write-information storage memory and outputs a write-prohibition signal to the writing circuit 13. This cancels the write signal inputted by the user, and the data which was previously written is maintained. Therefore, the user is able to write to a given address the first time, but the writing is in fact cancelled on the second time, whereby attaining an effect of a protection function.

Next, when the data in the write-information storage memory is "0" indicating that no data writing has been performed, the control logic circuit 14 receives the signal outputted from the write-information storage memory and outputs a write-permission signal to the writing circuit 13. Accordingly, the IC is able to write the data inputted by the user as it normally does. Further, the IC simultaneously writes a "1", indicating that data has already been written, into the write-information storage memory corresponding to the above-mentioned address, thereby recording that data has already been written to the above-mentioned address.

Further, in accordance with the present embodiment, the write-information storage memory is an electrically writable/erasable semiconductor memory element, as is the user memory. As such, the EEPROM circuit can be used for the reading circuit which reads the data in the write-information storage memory, and for the writing circuit which writes the data, thus having a characteristic that extra peripheral circuitry is not necessary.

Further, since it is also possible to input a given instruction and initialize the data in the write-information storage memory, convenience of use is improved for the user.

Here, explanation will now be made of specific examples of the user memory section 10 and the write-information storage memory shown in FIG. 1.

Figure 2:
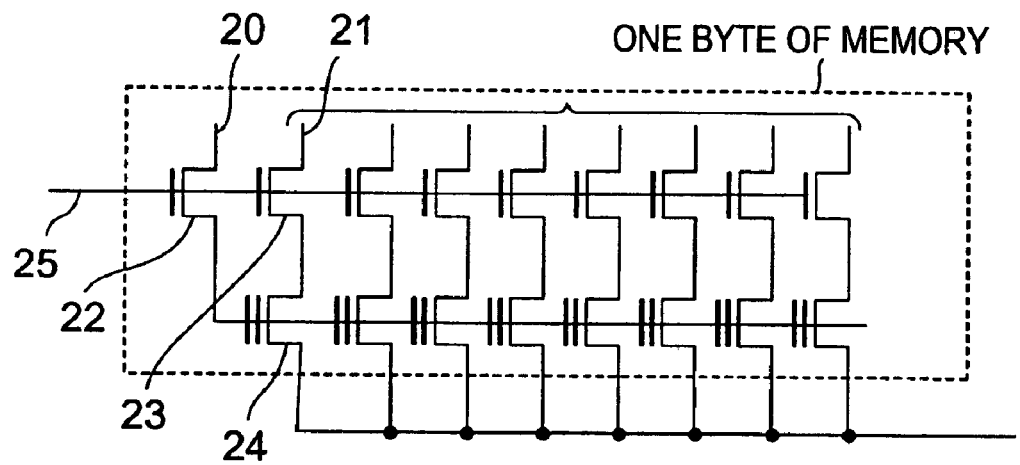
FIG. 2 is a diagram showing a circuit structure of a conventional 1-byte memory circuit.

FIG. 2 shows 1 byte of a conventional memory cell. The memory byte is composed of a sense line 20 and a plurality of bit lines 21. Connected to the sense line 20 is a byte select transistor 22, and connected to the bit line 21 are a select gate transistor 23 and a memory cell 24. In a serial input EEPROM, the bit line is typically composed of 8 bits.

When the write command is inputted, a word line 25 of the address to which data is to be written is selected, and the select gate transistor 23 in the byte turns on. At this time, an electrical voltage that corresponds to the data to be written is applied to the sense line 20 and the bit line 21, thereby writing the data into the memory.

Figure 3:
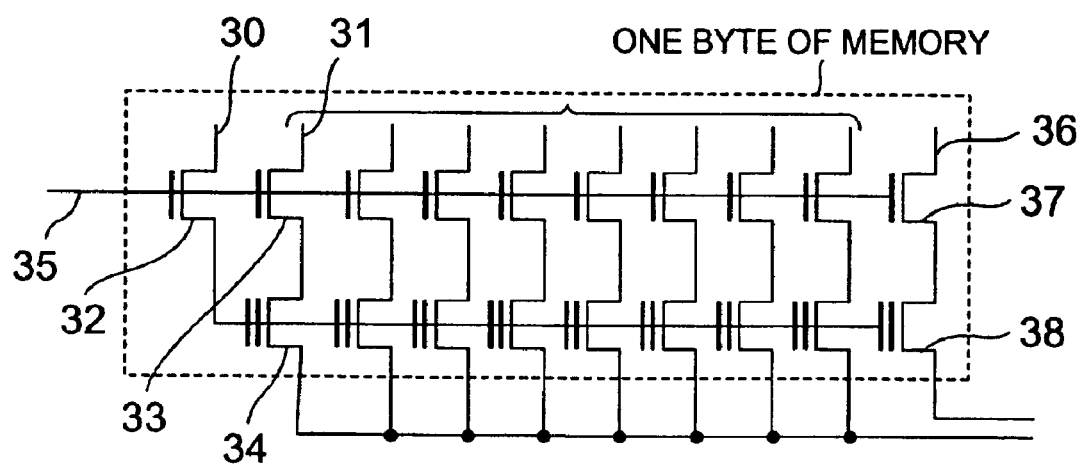
FIG. 3 is a diagram showing a circuit structure of a circuit according to Embodiment 1 of the present invention.

FIG. 3 is a diagram showing 1 byte of a memory cell according to the present invention. FIG. 3 shows a construction in which a 1-bit redundant memory is arranged inside the byte that is composed of a user memory of 1 bit or of a plurality of bits, and in which with one write operation it is possible to write data to the user memory and simultaneously write to the redundant memory the information indicating whether or not data has been written to the user memory. In this construction, a 1-bit bit line 36, a select gate transistor 37 and a memory cell 38 are added to the circuitry diagram drawn in FIG. 2. The bit line 36, the select gate transistor 37 and the memory cell 38 correspond to the write-information storage memory 11 shown in FIG. 1. Signals from the writing circuit 13 and from the address decoder 17 are inputted into a bit line 35 and into the bit line 36. Further, a signal from the write-information storage memory is outputted from the bit line 36 into the reading circuit 12.

Here, a memory cell 34, which is connected to the memory cell bit line 31 that is originally provided, is the user memory to which the user can write the data by means of the write command, and the memory cell 38 connected to the bit line 36 is the write-information storage memory.

When the user gives the write command as described above, the EEPROM automatically reads out the data in the write-information storage memory. If no data has been written to the memory to which data is to be written, then writing is performed to this user memory and data indicating that data has been written to this memory is written into the write-information storage memory.

As shown in FIG. 3, the word line 35 is shared by a byte select transistor 32, and select gate transistors 33 and 37. Therefore, it is possible to write to the user memory 24 and to the write-information storage memory 38 simultaneously, eliminating the need to spend extra time for the EEPROM to write the data.

(Embodiment 2)

Figure 4:
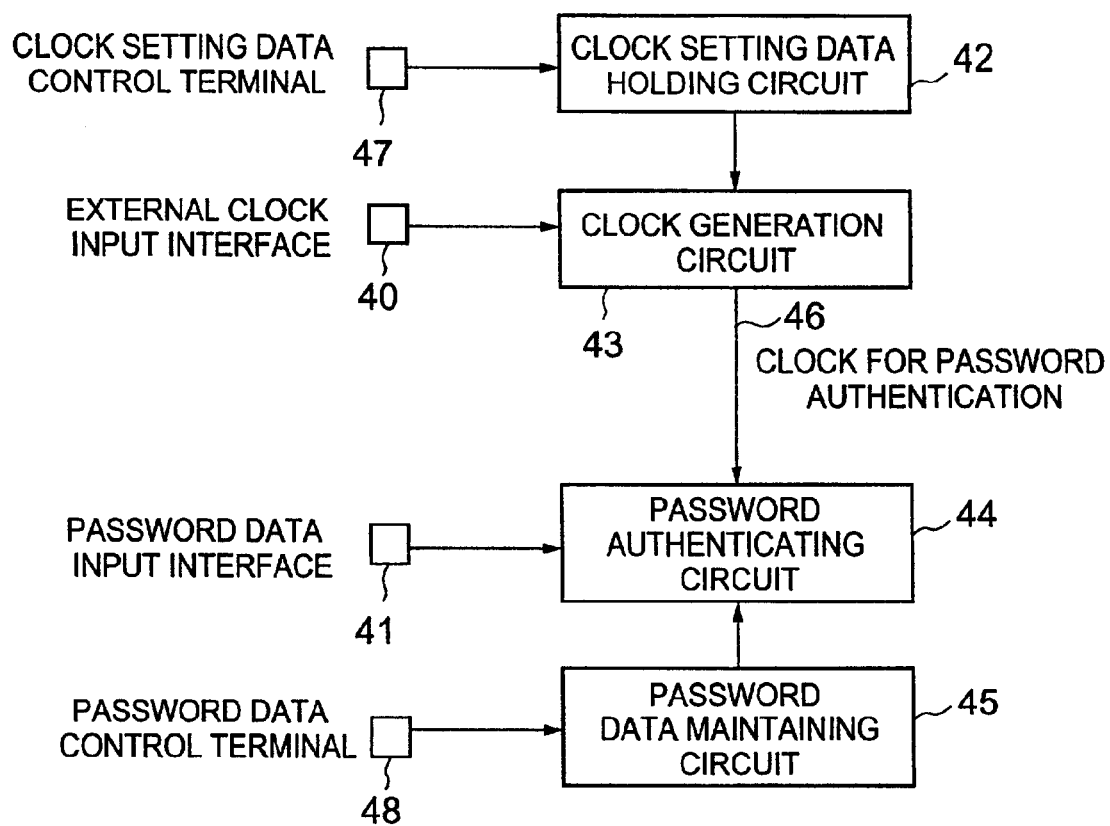
FIG. 4 is a diagram showing a circuit structure of a password authenticating circuit according to Embodiment 2 of the present invention.

Next, explanation will be made of a construction for performing a password authentication and a write permission/prohibition, at a time when data or the like is to be written by the user. FIG. 4 shows a construction of a password authentication circuit.

In FIG. 4, the password authentication circuit is composed of an external clock input interface 40 to input a base clock to be used in the password authentication; a password data input interface 41 to input a given, password; a clock setting data holding circuit 42 for holding data to set the frequency of the clock used in the password authentication; a clock generation circuit 43 for generating the clock to be used in the password authentication, based on the clock setting data; a password authenticating circuit 44 for authenticating the inputted password against a maintained password (password data); a password data maintaining circuit 45 for maintaining a password used in the authentication; a clock setting data control terminal 47 capable of configuring the clock setting data; and a password data control terminal 48 capable of configuring the password data to be used in the authentication.

Here, each of the terminals 40, 41, 47 and 48 are included in the input interface 15 shown in FIG. 1. Further, the clock setting data holding circuit 42, the clock generation circuit 43, the password authenticating circuit 44 and the password data maintaining circuit 45 are included in the control logic circuit 14 shown in FIG. 1. Signals inputted into each of the terminals 40, 41, 47 and 48 are inputted into the control logic circuit 14 via the mode decode logic circuit 16.

Next, operation will be explained. The base clock inputted from the external clock input interface 40 is inputted into the clock generation circuit 43. Further, by means of the clock setting data holding circuit 42 and the clock setting data control terminal 47, the clock generation circuit 43 generates a password authentication clock 46 which is configured according to a set clock frequency.

The password authentication clock 46 is inputted into the password authenticating circuit 44 and is used as a synchronization clock for comparing and authenticating the authentication password data which is configured by the password data maintaining circuit 45 and the password data control terminal 48, against the password data which is inputted from the password data input interface 41.

In the case where the clock setting data and the password data to be used for the authentication are to be set from external terminals, the clock setting data is set using the clock setting data control terminal 47, and the authentication password data is set using the password data control terminal 48. In the case where the clock setting data control terminal 47 and the password data control terminal 48 are not used, a non-volatile memory such as a mike ROM, an EPROM, an EEPROM, a Flash/EEPROM, a fuse, a gate array or an MRAM is used to store the clock setting data, and a non-volatile memory such as an SRAM or a DRAM is used to store the password data.

The information inputted from the password data input interface 41 and the information in the password data maintaining circuit 45 are compared against each other. If the password information satisfies desired conditions, then the write-permission signal is outputted to the writing circuit 13 from the control logic circuit 14 which is shown in FIG. 1 and includes the password authenticating circuit 44.

Further, if the password information does not satisfy the desired conditions, then the write-prohibition signal is outputted to the writing circuit 13 from the control logic circuit 14 which is shown in FIG. 1 and includes the password authenticating circuit 44.

As described above, in accordance with the present invention, a function equivalent to the protection function can be achieved without using the protection function, and no burden whatsoever is imposed on the user.

Further, once data is written, even when the user gives a write command to write to the same memory array where the data has been written, the IC's write operation is stopped. Therefore, it is easy to achieve enhanced memory security, thereby enabling improved convenience of use.

Further, the provision of the password authenticating circuit enables enhanced security. Further, the clock which is used for the password authentication is changeable, thereby enabling further improvement of the security without increasing the number of bits in the password authentication.

What is claimed is:

1. An electrically writable and erasable semiconductor memory device, comprising:

a user memory to which a user can write freely chosen data, and a write-information storage memory for storing information indicating whether or not data has been written in the user memory;

a reading circuit for reading the data in the user memory and in the write-information storage memory;

a writing circuit for writing the data into the user memory and for writing the information into the write-information storage memory; and a control logic circuit for analyzing whether to execute a write command from the user, based on the data read out from the write-information storage memory, wherein in a case where data is already written into the write-information storage memory, the control logic circuit outputs a write-prohibition signal to the writing circuit.

2. A semiconductor memory device according to claim 1, wherein when a user performs a given write command for writing data into the user memory via an input interface provided to an IC, data is read out from a redundant memory that is associated with the user memory where the data is to be written, and when a judgment is made as to whether or not data has been written to the user memory and it is determined that writing has already been performed, the write command from the user is cancelled so that the data stored in the user memory is maintained.

3. A semiconductor memory device according to claim 1, wherein when a user performs a given write command for writing data into the user memory via an input interface provided to an IC, an IC automatically executes an operation to write information indicating that data has been written to the user memory into a redundant memory associated with the user memory where the data was written.

4. A semiconductor memory device according to claim 1, wherein the write-information storage memory which stores the information indicating whether or not data has been written in the user memory is non-volatile, and maintains the stored information regardless of whether a power supply voltage is turned on or off.

5. A semiconductor memory device according to claim 1, wherein the write-information storage memory storing the information indicating whether or not data has been written in the user memory is volatile, and when a power source is turned off, the stored information is initialized so that the information indicating whether or not the data is written into the user memory from after the power is turned on is maintained.

6. A semiconductor memory device according to claim 1, wherein the user cannot write freely chosen data into the write-information storage memory that stores the information indicating whether or not the data has been written in the user memory, and in order to write data to the write-information storage memory for the purpose of initializing the information in the write-information storage memory, a given command is inputted via an input interface.

7. A semiconductor memory device according to claim 1, wherein the user can write freely chosen data into the write-information storage memory that stores the information indicating the number of times data has been written to the user memory, and the write-information storage memory can be also used as the user memory.

8. A semiconductor memory device according to claim 1, wherein the device has a byte structure in which a 1-bit redundant memory is arranged inside a byte that is composed of one or a plurality of bits of user memory, and with one write operation it is possible to write data to the user memory and simultaneously write to the redundant memory the information indicating whether or not data has been written to the user memory.

9. A semiconductor memory device according to claim 1, wherein the control logic circuit comprises a password authentication circuit for authenticating a password inputted through an input interface by comparing it against a password data maintained inside the control logic circuit.

10. A semiconductor memory device according to claim 9, wherein the control logic circuit comprises a clock generation circuit for generating, from a base clock, a clock used for the password authentication; and wherein the frequency of the clock used for the password authentication is changeable by means of clock setting data input to a clock setting data holding circuit.

11. A semiconductor memory device according to claim 10, wherein the clock setting data for setting the frequency of the clock used in the password authentication is non-volatile, and the clock setting data is maintained regardless of whether a power supply voltage is turned on or off.

12. A semiconductor memory device according to claim 10, wherein the clock setting data for setting the frequency of the clock used in the password authentication is volatile, and when a power source is turned off, the stored information is initialized so that the clock setting data from after the power is turned on is maintained.

13. A semiconductor memory device according to claim 10, wherein the clock setting data for setting the frequency of the clock used in the password authentication is set from an external terminal.

14. A semiconductor memory device according to claim 9, wherein the password data used for password authentication, against which the inputted password is compared, is non-volatile, and the stored information is maintained regardless of whether a power supply voltage is turned on or off.

15. A semiconductor memory device according to claim 9, wherein the password data used for password authentication, against which the inputted password is compared, is volatile, and when a power source is tuned off, the stored information is initialized so that the clock setting data from after the power is tuned on is maintained.

16. A semiconductor memory device according to claim 9, wherein the password data used for password authentication, against which the inputted password is compared, is set from an external terminal.

* * * * *